(12) United States Patent
Todorovic et al.

(10) Patent No.: US 11,187,186 B2
(45) Date of Patent: Nov. 30, 2021

(54) EXHAUST NOZZLE OF A GAS TURBINE ENGINE

(71) Applicant: Rolls-Royce Deutschland Ltd & Co KG, Blankenfelde-Mahlow (DE)

(72) Inventors: Predrag Todorovic, Berlin (DE); Thomas Schillinger, Berlin (DE)

(73) Assignee: ROLLS-ROYCE DEUTSCHLAND LTD & CO KG, Blankenfel de-Mahlow (DE)

( * ) Notice: Subject to any disclaimer, the term of this patent is extended or adjusted under 35 U.S.C. 154(b) by 176 days.

(21) Appl. No.: 16/719,049

(22) Filed: Dec. 18, 2019

(65) Prior Publication Data

US 2021/0190004 A1 Jun. 24, 2021

(51) Int. Cl.

| F02K 1/08 | (2006.01) |
|---|---|
| F02K 1/80 | (2006.01) |
| F02K 1/72 | (2006.01) |
| F02K 1/60 | (2006.01) |
| F02K 1/62 | (2006.01) |
| F02K 1/09 | (2006.01) |

(52) U.S. Cl.
CPC ............... *F02K 1/08* (2013.01); *F02K 1/72* (2013.01); *F02K 1/80* (2013.01); *F02K 1/09* (2013.01); *F02K 1/60* (2013.01); *F02K 1/62* (2013.01); *F05D 2220/323* (2013.01); *F05D 2220/36* (2013.01); *F05D 2220/80* (2013.01); *F05D 2250/323* (2013.01); *F05D 2250/324* (2013.01)

(58) Field of Classification Search
CPC .................................... F02K 1/08; F02K 1/80
See application file for complete search history.

(56) References Cited

U.S. PATENT DOCUMENTS 3,807,639 A * 4/1974 Soligny .................... F02K 1/08
239/265.19

FOREIGN PATENT DOCUMENTS

DE 102017130563 A1 6/2019

* cited by examiner

*Primary Examiner* — Andrew H Nguyen
(74) *Attorney, Agent, or Firm* — Shuttleworth & Ingersoll, PLC; Timothy Klima

(57) ABSTRACT

An exhaust nozzle of a gas turbine engine which includes an outer nozzle wall, a flow channel which is limited radially outwards by the nozzle wall, a centerbody arranged in the flow channel, and exactly one strut connecting the centerbody to the nozzle wall. The strut is connected to the nozzle wall by means of a connecting structure that is displaceable in the axial direction of the outer nozzle wall. At least one actuator is provided interacting with the connecting structure or the outer nozzle wall for displacing the strut in the axial direction.

20 Claims, 8 Drawing Sheets

EXHAUST NOZZLE OF A GAS TURBINE ENGINE

The present disclosure relates to an exhaust nozzle of a gas turbine engine.

It is known to provide for a variable area exhaust nozzle that comprises an outer nozzle wall and a centerbody that is displaceable in the axial direction relative to the outer nozzle wall. Document DE 10 2017 130 563 A1 describes an exhaust nozzle of a turbofan engine that comprises a centerbody which is connected by means of struts to an outer nozzle wall. To move the centerbody in the axial direction, the struts are axially displaceable relative to the nozzle wall.

In such arrangement, the centerbody and the struts are exposed both to the hot core airflow from the primary channel that has passed the core engine and to the colder bypass airflow from the bypass channel, whereas the outer nozzle wall is exposed mostly to the colder bypass airflow. This leads to a different thermal expansion of these components and, accordingly, to thermal stresses acting on these components.

Generally, there are two different types of thermal loading on the centerbody and the struts: primary thermal loading is the overall thermal expansion of the centerbody with struts towards the outer nozzle structure leading to primary thermal stresses, and secondary thermal loading are thermal gradients within the centerbody/struts structure.

There is a need to provide for a variable area exhaust nozzle with a centerbody that is displaceable in the axial direction that avoids the generation of primary thermal stresses that act on the outer nozzle wall.

According to an aspect of the invention, an exhaust nozzle for a gas turbine engine is provided, wherein the exhaust nozzle comprises an outer nozzle wall, a flow channel which is limited radially outwards by the nozzle wall and a centerbody arranged in the flow channel. It is provided that a single strut connects the centerbody to the nozzle wall. The strut is connected to the nozzle wall by means of a connecting structure that is displaceable in the axial direction of the outer nozzle wall. At least one actuator is provided that interacts with the connecting structure or the outer nozzle wall for displacing the strut in the axial direction.

Aspects of the invention are thus based on the idea to avoid the problem of primary thermal stresses acting on (radially) opposite sides of the outer nozzle wall by providing a one side mounting of the centerbody to the nozzle. This solution avoids the problem of thermal stresses completely.

Another advantage associated with such a solution lies in that it reduces pressure losses in the nozzle as a pressure loss occurs at one strut only compared to pressure losses at a plurality of struts. Further, the manufacturing method is simplified as the centerbody needs to be connected with the outer nozzle wall at one location only.

In an embodiment, the connecting structure comprises at least one boxlike hollow structure (also referred to as torsion box). A boxlike hollow structure provides efficient resistance to both torsional and bending forces which apply at the interconnection between the strut and the outer nozzle wall. The rotational stiffness of a structure depends on its cross-sectional area and its shape. By providing a boxlike hollow structure strong resistance against torsional forces can be achieved while at the same time providing for a lightweight solution as the boxlike structure is hollow. This allows to position the centerbody in a vertical plane and at the centerline in the exhaust nozzle despite of torsional forces acting on the centerbody. The boxlike hollow structure may have substantially the form of a cuboid, wherein the cuboid is bent in the circumferential direction.

As boxlike hollow structure is considered any structure which comprises a plurality of walls which define an inner volume, wherein the inner volume is hollow in the sense that is not of solid matter. The inner volume being hollow does not exclude that elements such as spars may be located in the inner volume. Also, the inner volumne may comprise additional inner walls to further increase the stiffness. It is further pointed out that it is not necessarily required that at all surfaces which confine the defined volume a wall is present. For example, if the boxlike hollow structure is a cuboid, one of the walls of the cuboid may be missing.

In an embodiment, a receiving feature is formed in the nozzle wall which extends in the axial direction for receiving and guiding the connecting structure. In particular, when the connecting structure is a boxlike connecting structure, the boxlike connecting structure is slidably arranged in the receiving feature.

To provide for high torsional stiffness, according to an embodiment, the receiving feature comprises upper and lower guide elements which may be formed as rail grooves or rail slots for guiding upper and lower rails provided at the boxlike connecting structure, wherein the boxlike connecting structure with upper and lower rails is also referred to as a train frame. In such embodiment, the boxlike connecting structure can be axially displaced as a whole with the rails of the boxlike connecting structure being guided in the rail grooves of the receiving feature.

To even further increase the stiffness of the construction, the receiving feature may be formed also by a boxlike hollow structure which is fixed in the outer nozzle wall, wherein the receiving feature boxlike hollow structure has an open longitudinal side into which the boxlike connecting structure is inserted. In such embodiment, one boxlike structure (the boxlike connecting structure or train frame) is axially displaceable in another boxlike structure (the boxlike receiving feature) which is fixed.

In a further embodiment, also the strut that extends radially between the centerbody and the connecting structure comprises a boxlike hollow structure to reduce deformation under torsional forces. Stiffness of the strut may be further increased in that the strut comprises a plurality of spars which extend mostly in the radial direction and which are connected to the connecting structure. If the strut has a boxlike hollow structure, the spars extend within such boxlike hollow structure.

In an embodiment, the spars each comprise a flat T-like end that is connected to the connecting structure, wherein the T-like ends that are connected to the connecting structure may be oriented in the circumferential direction. The provision of such spars with T-like ends increases both the rigidity of the strut and the rigidity of its connection to the connection structure.

In an embodiment, the whole centerbody and the strut boxlike hollow structure can be made from single piece of material (for example, a ceramic metallic composite) with integrated spars or other features that increase bending and torsional stiffness.

In an embodiment, the connecting structure comprises at least one interaction element which interacts with the at least one actuator for axial movement of the strut, wherein the at least one actuator is located in a fixed manner outside the connecting structure. Accordingly, the interaction element is a part of the connecting structure while the actuator is attached in a fixed manner in the outer nozzle wall or in a pylon or fuselage to which the gas turbine engine may be attached.

However, this is not necessarily the case. In other embodiments, it may be provided that the actuator is located inside and is attached to the connecting structure. In such case, the actuator interacts, e.g., with an interaction structure such as a toothing formed in or connected to the outer nozzle wall. Furthermore, if a linear actuatior is integrated inside the connecting structure, for example, a linear actuator of the hydraulic piston type, the piston may be an integral part of the connecting structure.

When the actuator is located outside the connecting structure, the connecting structure may comprise as interaction elements an upper toothed rack and a lower toothed rack which are spaced apart in the circumferential direction, wherein the upper toothed rack and the lower toothed rack interact with an upper actuator and a lower actuator, respectively, located in the outer nozzle wall. The upper toothed rack and the lower toothed rack may be implemented in the upper and lower rails of the boxlike connecting structure discussed above.

In an embodiment, the actuators each comprises a worm screw that interacts with the upper toothed rack and the lower toothed rack, respectively, wherein the actuator and the toothed rack form a worm and rack drive.

In another embodiment, the connecting structure comprises as interaction element one or several lugs or the like for connection to a linear actuator which may be an electric, pneumatic or hydraulic linear actuator. In such case, the actuator is not a rotational actuator which translates its rotational movement through a warm and rack drive to a linear movement of the connecting structure but instead by a linear actuator.

It is provided that the connecting structure constrains movement of the strut relative to the nozzle wall in the radial direction and in the circumferential direction but allows movement of the strut relative to the nozzle wall in the axial direction. This may be achieved by a form-fit in the radial and circumferential directions of the connecting structure in the receiving feature.

In an embodiment, the connection structure may be realized in an inboard area of the nozzle located adjacent an aircraft fuselage that carries the gas turbine engine which implements the exhaust nozzle. As the radial thickness of the nozzle wall may be increased by the connection structure, it can be preferable to provide for the increased radial thickness next to the fuselage. Also, this allows to place elements of the actuator such as the motor in the pylon or fuselage.

In an embodiment, the strut is connected to a structure of the outer nozzle wall that forms part of a thrust reverser unit. This includes that the strut may be connected to a structure that serves to support a pivot door of the thrust reverser unit such as a side beam of the outer nozzle wall that comprises a hinge for a pivot door.

The exhaust nozzle may be a convergent-divergent nozzle, wherein the cross-section of the nozzle first decreases in the downstream direction towards a nozzle throat area (usually referred to as A8) and subsequently increases until it reaches the nozzle exit area (usually referred to as A9). By translating the centerbody relative to the outer nozzle wall, the degree of expansion of the flow channel behind the nozzle throat area, i.e. the ratio of A9 to A8, can be adjusted.

According to an embodiment, the nozzle is configured as the nozzle of a supersonic gas turbine engine which is designed for operating conditions in the subsonic, transonic and supersonic ranges.

In an embodiment, an exhaust nozzle of a gas turbine engine is provided, wherein the exhaust nozzle comprises:
an outer nozzle wall,
a flow channel which is limited radially outwards by the nozzle wall,
a centerbody arranged in the flow channel, and
exactly one strut connecting the centerbody to the nozzle wall,
wherein the strut is connected to the nozzle wall by means of a connecting structure that is displaceable in the axial direction in a receiving feature in the outer nozzle wall,
at least one actuator interacting with the connecting structure or the outer nozzle wall for displacing the strut in the axial direction,
wherein the connecting structure comprises a boxlike hollow structure and wherein the receiving feature comprises a boxlike hollow structure fixed in the outer nozzle wall, wherein the boxlike connecting structure is displaceable in the axial direction in the boxlike receiving feature,
wherein the boxlike connecting structure comprises upper and lower rails,
wherein the boxlike receiving feature comprises upper and lower rail grooves, and
wherein the upper and lower rail grooves of the boxlike receiving feature receive the upper and lower rails of the boxlike connecting structure, respectively.

The outer nozzle wall may comprise a structure that forms part of a thrust reverser unit, in particular fixed side beams that serve to support pivot doors of the thrust reverser unit. Such side beams may comprise hinges or lugs for the pivot doors. The boxlike receiving feature may be integrated into such side beam.

It should be noted that, when referring to a movement in the axial direction, the movement can be both in the axial direction and against the axial direction, i.e., back and forth.

It should further be noted that the present invention is described in terms of a cylindrical coordinate system having the coordinates x, r and φ. Here x indicates the axial direction, r the radial direction and φ the angle in the circumferential direction. The axial direction is defined by the machine axis/engine centerline of the gas turbine engine, with the axial direction pointing from the engine inlet to the engine outlet. The axial direction of the gas turbine engine is at least substantially identical with the axial direction of the exhaust nozzle of the gas turbine engine. Starting from the x-axis, the radial direction points radially outwards. Terms such as "in front of" and "behind" refer to the axial direction or flow direction in the engine. Terms such as "outer" or "inner" refer to the radial direction.

The invention will be explained in more detail on the basis of exemplary embodiments with reference to the accompanying drawings in which.

Figure 1:
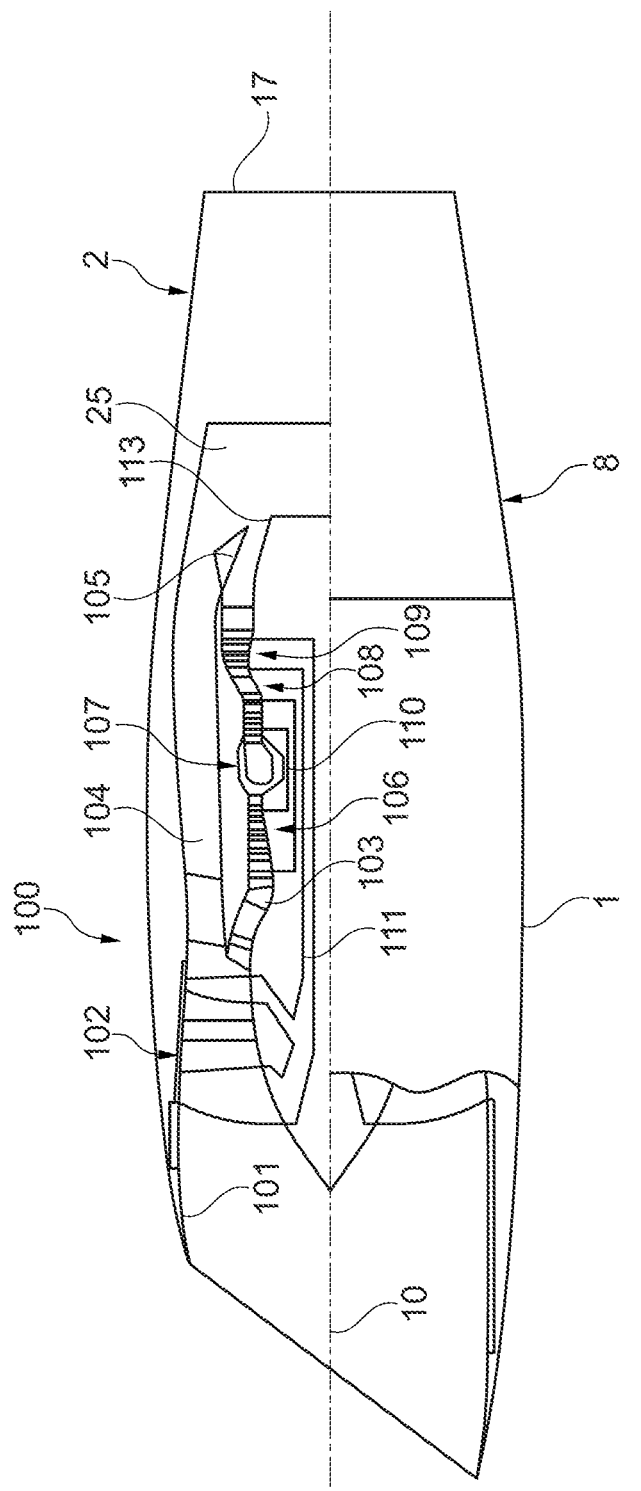
FIG. 1 is a schematic sectional side view of a supersonic gas turbine engine.

FIG. 1 shows a turbofan engine which is intended and suitable for use in a civil or military supersonic aircraft and, accordingly, is designed for operating conditions in the subsonic, transonic and supersonic ranges. However, it should be noted that the principles of this invention can also be implemented in a turbofan engine designed for subsonic operation only. The description of the invention in the context of an engine intended for a supersonic aircraft is therefore only to be understood as an example.

The turbofan engine 100 comprises an engine intake 101, a fan 102 which may be a multi-stage fan, a primary flow channel 103 which passes through a core engine, a secondary flow channel 104 which bypasses the core engine, a mixer 105 and a nozzle 2 in which a thrust reverser 8 can be integrated.

The turbofan engine 100 has a machine axis or engine centerline 10. The machine axis 10 defines an axial direction of the turbofan engine. A radial direction of the turbofan engine is perpendicular to the axial direction.

The core engine comprises a compressor 106, a combustion chamber 107 and a turbine 108, 109. In the example shown, the compressor comprises a high-pressure compressor 106. A low-pressure compressor is formed by the areas close to the hub of the fan 102. The turbine behind the combustion chamber 107 comprises a high-pressure turbine 108 and a low-pressure turbine 109. The high-pressure turbine 108 drives a high-pressure shaft 110 which connects the high-pressure turbine 108 with the high-pressure compressor 106. The low-pressure turbine 109 drives a low-pressure shaft 111 which connects the low-pressure turbine 109 with the multi-stage fan 102. According to an alternative design, the turbofan engine may also have a medium-pressure compressor, a medium-pressure turbine and a medium-pressure shaft. Furthermore, in an alternative design it can be provided that the fan 102 is coupled to the low-pressure shaft 111 via a reduction gearbox, e.g., a planetary gearbox.

The turbofan engine is arranged in an engine nacelle 1. The engine nacelle 1 may be connected to the aircraft fuselage via a pylon.

The engine intake 101 forms a supersonic air intake and is, therefore, designed and suitable for decelerating the incoming air to velocities below Ma 1.0 (Ma=Mach number). The engine inlet is beveled in FIG. 1, with the lower edge protruding from the upper edge, but other kinds of supersonic intakes may be implemented instead.

The flow channel through the fan 102 is divided behind the fan 102 into the primary flow channel 103 and the secondary flow channel 104. The secondary flow channel 104 is also referred to as the bypass channel.

Behind the core engine, the primary flow in the primary flow channel 103 and the secondary flow in the secondary flow channel 104 are mixed by the mixer 105. Furthermore, an outlet cone 113 is mounted behind the turbine in order to achieve desired cross-sections of the flow channel.

The rear area of the turbofan engine is formed by an integral nozzle 2, where the primary and secondary flows are mixed in the mixer 105 before being fed into the integral nozzle 2. The engine behind mixer 105 forms a flow channel 25, which extends through nozzle 2. Alternatively, separate nozzles can be provided for the primary flow channel 103 and the secondary flow channel 104 meaning that the flow through the secondary flow channel 104 has its own nozzle that is separate to and radially outside the core engine nozzle. One or both nozzles (whether mixed or split flow) may have a fixed or variable area.

In the context of this invention, the design of the nozzle 2 is of relevance.

Figure 2:
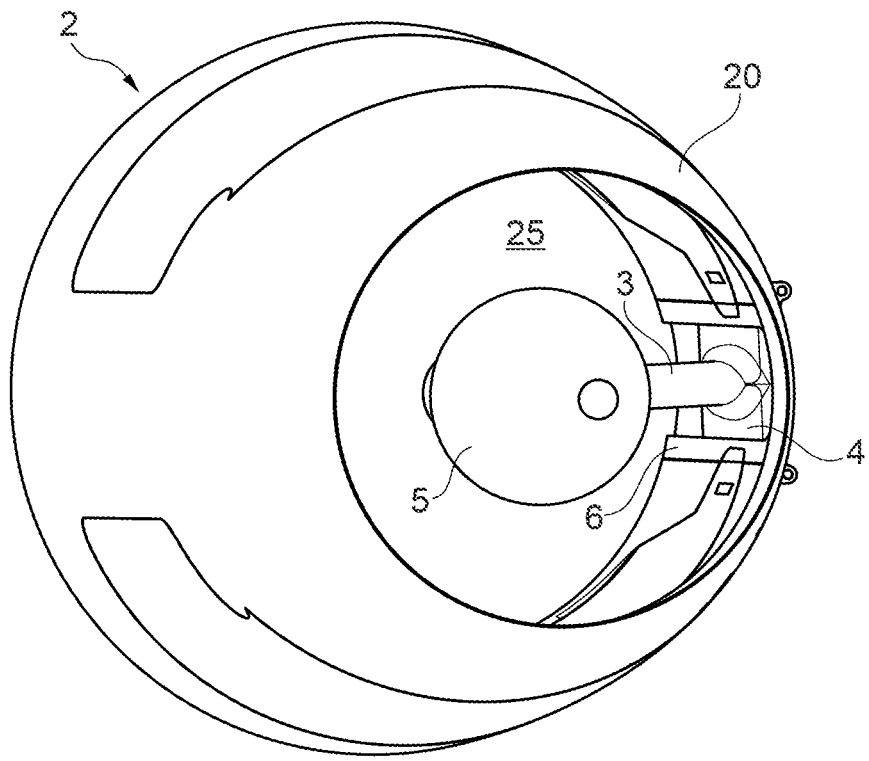
FIG. 2 is a perspective rear view of an embodiment of a nozzle that comprises a centerbody which is attached by means of a single strut to a nozzle outer wall.

FIG. 2 shows in perspective view from the rear the basic design of the nozzle 2. The nozzle 2 comprises an outer nozzle wall 20 which forms the radially outer boundary of a flow channel 25 through the nozzle 2. The nozzle 2 also includes a centerbody 5. The centerbody 5 has a longitudinal axis identical to the engine centerline 10. The centerbody 5 forms an upstream end, a downstream end and a maximum of its cross-sectional area between the upstream end and the downstream end.

The nozzle 2 further comprises a single strut 3 which connects the centerbody 5 to the nozzle wall 20. To connect the strut 3 to the nozzle wall 20, a connecting structure 4 is provided that is axially displaceable within a receiving feature 6 formed in the nozzle wall 20. Accordingly, the strut 3 and, thereby, the centerbody 5 can be displaced relative to the outer nozzle wall 20. Embodiments of the connecting structure 4 and of the receiving feature 6 will be discussed with respect to FIGS. 6A to 13.

Figure 3:
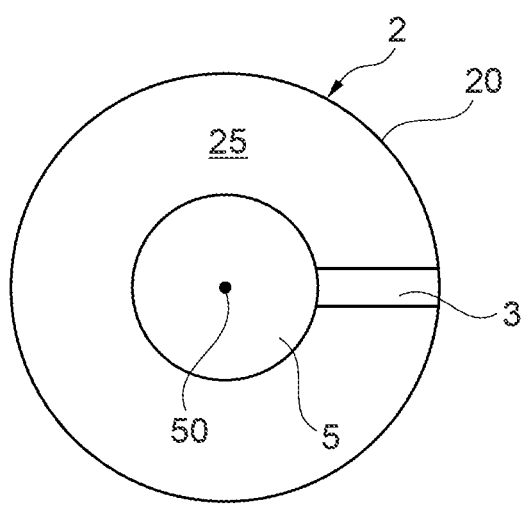
FIG. 3 illustrates the position of the centerbody in the nozzle in a hot condition.
Figure 4:
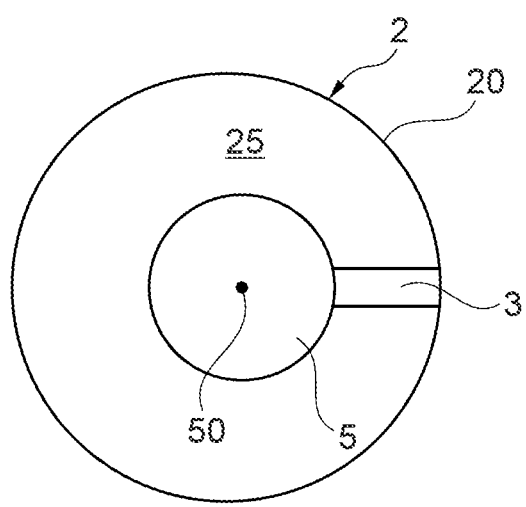
FIG. 4 illustrates of the position of the centerbody in the nozzle in a cold condition.

FIGS. 3 and 4 show the position of the centerbody 5 within the nozzle 2 in a hot condition and in a cold condition, wherein FIG. 3 depicts the hot condition and FIG. 4 depicts the cold condition. In the cold condition, the radial extension of the centerbody 5 and the strut 3 are reduced compared to the hot condition when the centerbody 5 and the strut 3 thermally expand due to hot core airflow that they are exposed to. The centerbody 5 and the strut 3 are designed such that the centerbody 5 is positioned exactly in the center of the nozzle 2 in the hot condition. Accordingly, in the hot condition, the longitudinal axis 50 of the centerbody 5 is identical to the engine centerline. Between the cold condition and the hot condition, the longitudinal axis 50 of the centerbody moves radially inwards towards the center of the nozzle 2.

Figure 5:
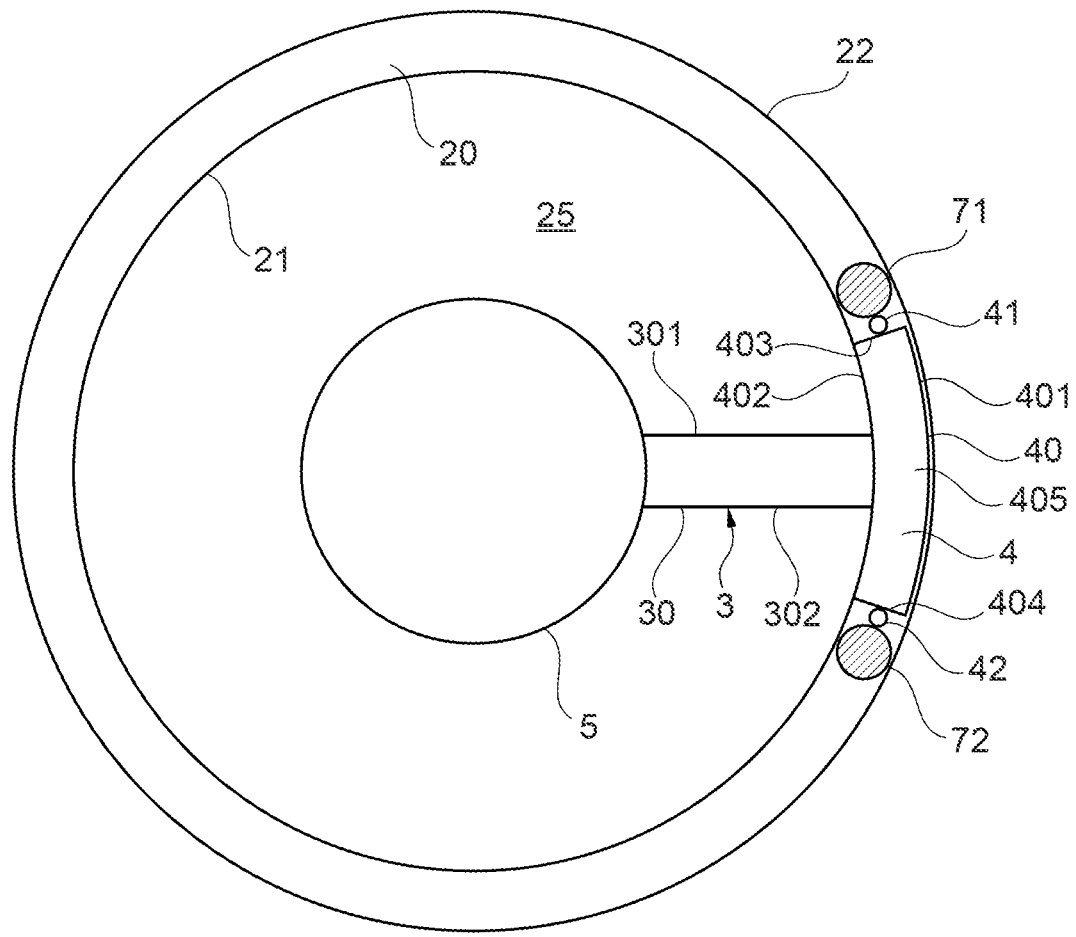
FIG. 5 is a schematic sectional view of a nozzle in which a centerbody is attached by means of a single strut to an outer nozzle wall, wherein the strut comprises a boxlike structure and wherein a connection structure which connects the single strut to the outer nozzle wall also comprises a boxlike structure.

FIG. 5 illustrates the interconnection between the strut 3 and the outer nozzle wall 20. The interconnection is provided for by a connecting structure 4 which is formed by a cuboid, boxlike hollow structure 40 which comprises the radially outer wall 401, a radially inner wall 402 and two circumferentially spaced side walls 403, 404. The radially outer wall 401 and the radially inner wall 402 are bent in the circumferential direction in accordance with the form of the outer nozzle wall 20. An inner volume 405 limited by these walls is hollow in the sense that it is not filled by a solid material. The provision of a boxlike hollow structure 40 provides for efficient resistance to torsional forces which apply at the interconnection between the strut 3 and the outer nozzle wall 20. The boxlike hollow structure 40 is in the following also referred to as first torsion box 40.

The first torsion box 40 is arranged in a receiving feature which extends in the axial direction within outer nozzle wall 20. Such receiving feature is not shown in FIG. 5 but will be discussed with respect to the remaining FIGS. 7 to 12. The receiving feature may also have a boxlike hollow structure.

To provide for an axial movement of the first torsion box 40 and, accordingly, of the strut 3 and the centerbody 5, an upper actuator 71 and a lower actuator 72 are provided which interact with an upper rail 41 and a lower rail 42 that are formed by or connected to the upper end and the lower end of the first torsion box 40. The upper actuator 71 and the lower actuator 72 are connected to the nozzle wall 20 or to a pylon or fuselage in a fixed manner and are configured to move the upper rail 41 and the lower rail 42 in the axial direction.

In the embodiment of FIG. 5, the strut 3 also comprises a boxlike hollow structure 30, wherein the boxlike hollow structure 30 extends radially between the centerbody 5 and the connecting structure 40. By including a boxlike hollow structure 30 in the strut 3, the stiffness and resistance against torsional forces of the strut 3 is increased. The boxlike hollow structure 30 comprises a top wall 301 and a bottom wall 302 which are spaced apart in the circumferential direction and two end walls which are spaced apart in the axial direction (not visible in FIG. 5). The boxlike hollow structure 30 of the strut 3 will in the following also be referred to as second torsion box 30.

Figure 6A:
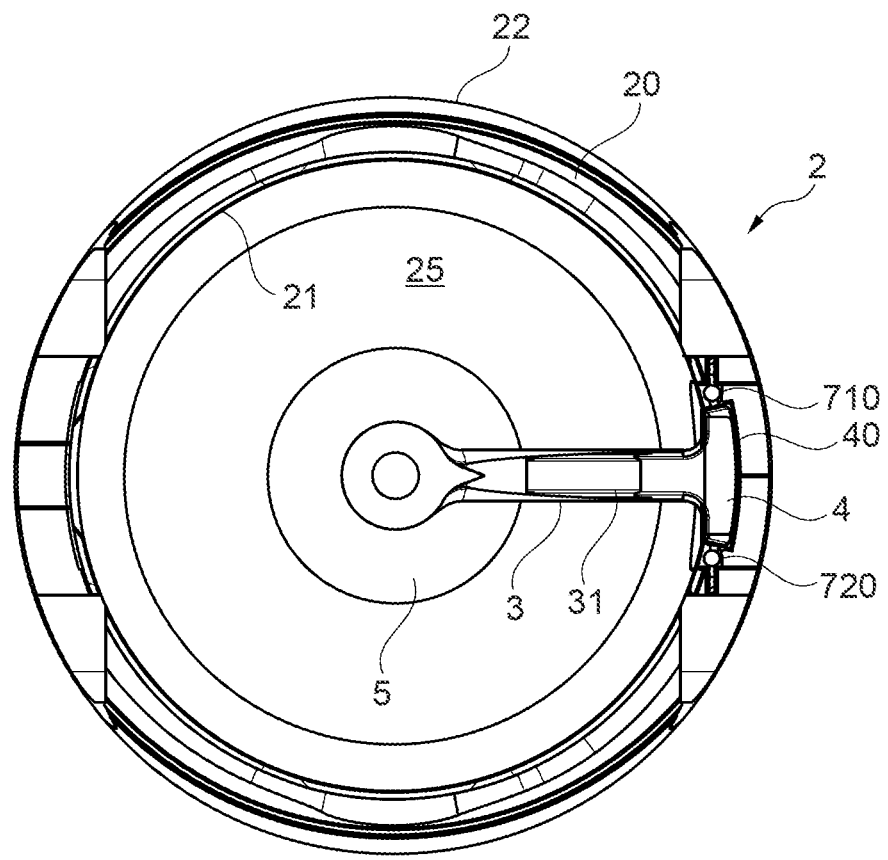
FIG. 6A shows an embodiment of the nozzle configuration of FIG. 5 in accordance with the embodiment of FIG. 2.

While FIG. 5 shows an embodiment of a nozzle 2 in a schematic manner, FIGS. 6A to 13 refer to a more precise embodiment which is to be understood as exemplary only. FIG. 6A is a cross-sectional view of a nozzle 2 similar to the view of FIG. 5. FIG. 6B is an enlarged view of the connecting structure 4.

Figure 6B:
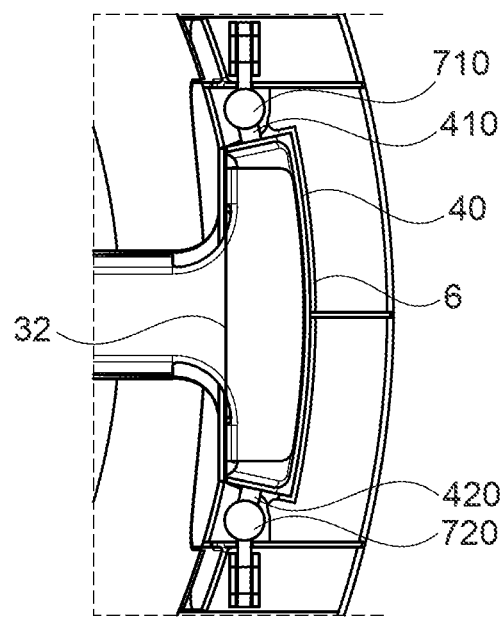
FIG. 6B is an enlarged view of the connection structure of the nozzle of FIG. 6A.
Figure 7:
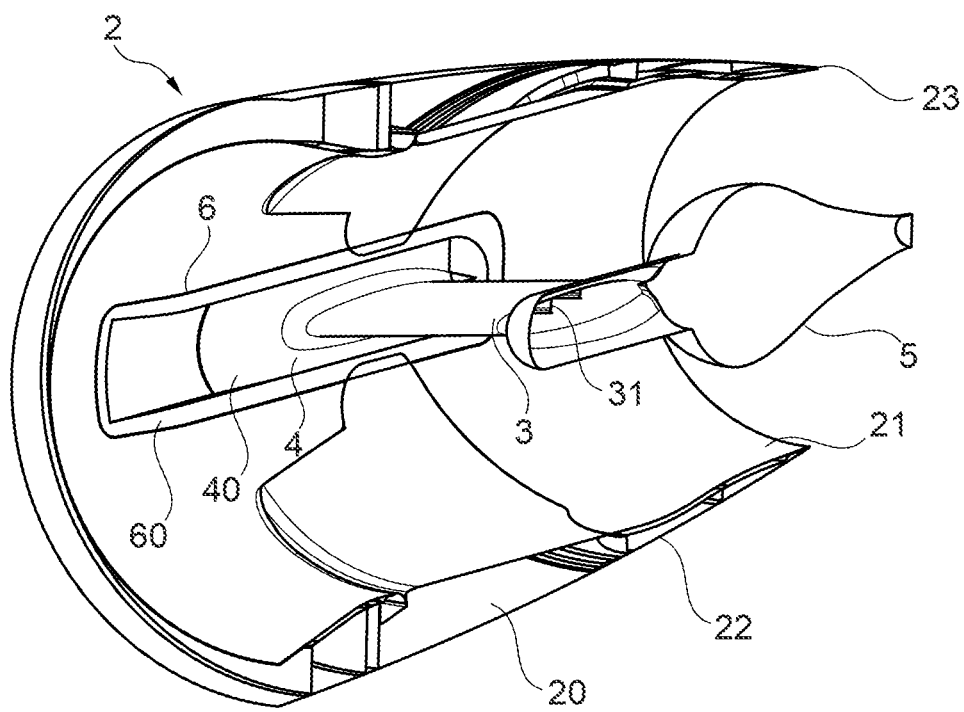
FIG. 7 is a partially cut, perspective view on half of the inside of the nozzle of FIGS. 2 and 5, wherein the centerbody and the single strut are located in a rearward position in the nozzle.
Figure 8:
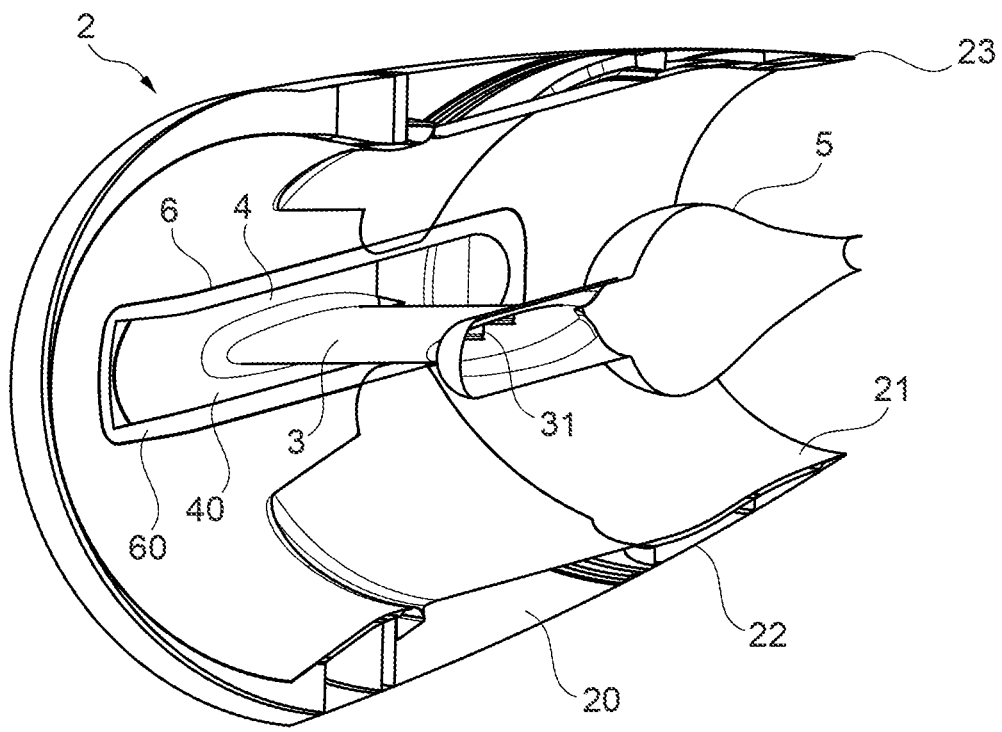
FIG. 8 is a partially cut, perspective view on half of the inside of the nozzle of FIGS. 2 and 5, wherein the centerbody and the single strut are located in a forward position in the nozzle.

Referring both to FIG. 6A and FIG. 6B, the nozzle wall 20 may comprise an inner wall 21 that limits the flow channel 25 through the nozzle and an outer wall 22 formed radially outside to the inner wall 21 that adjoins the surroundings. The inner wall 21 and the outer wall 22 may converge at a point downstream to form a nozzle exit edge 23 at their downstream end, as is shown in FIGS. 7 and 8.

The strut 3 comprises a plurality of spars 31 which extend in the radial direction and which are connected to the first torsion box 40. The spars 31 each form a flat T-like end that is connected to the first torsion box 40. The spars 31 will be explained in more detail with respect to FIGS. 11 and 12.

The upper actuator and the lower actuator for axially displacing the first torsion box 40 each comprise a worm screw 710, 720 that interacts with an upper toothed rack 410 and a lower toothed rack 420 connected to the upper and lower ends of the first torsion box 40. Accordingly, a worm and rack drive is provided for which transforms a rotational movement of the motor of the actuator into a linear movement. Other elements of the actuators such as an electric motor and a driving rod driving the worm screw 710, 720 are not shown in FIG. 6A.

Providing a driving force for axial movement of the first torsion box 40 by means of a worm and rack drive is to be understood as an example only. Other driving connections between the actuator and the torsion box may be implemented instead. Also, it is not necessarily the case that two actuators are provided for axial displacement of the torsion box 40. For example, one actuator could be provided for instead which interacts with a central interaction zone of the torsion box 40.

FIGS. 7 and 8 are perspective views from the inside of the nozzle to the areas of the nozzle wall 20 which comprise the connecting structure 4 and the receiving feature 6. The connecting structure 4 is formed as a first torsion box 40 as discussed. The receiving feature 6 arranged in the nozzle wall 20 is also formed as a boxlike hollow structure which in the following is also referred to as third torsion box 60. Accordingly, the first torsion box 40 is slidably arranged in the third torsion box 60. Thereby, a particular high stiffness against torsional forces is achieved. The construction of the third torsion box will be discussed in more detail with respect to FIG. 12. The receiving feature 6 may be formed in a side beam of the nozzle wall.

FIG. 7 shows the first torsion box 40 and, accordingly, the strut 3 and the centerbody 5 in a more rearward position. FIG. 8 shows the first torsion box 40 and, accordingly, the strut 3 and the centerbody 5 in a more forward position. The first torsion box 40 has moved in a linear manner in the third torsion box 60.

Figure 9:
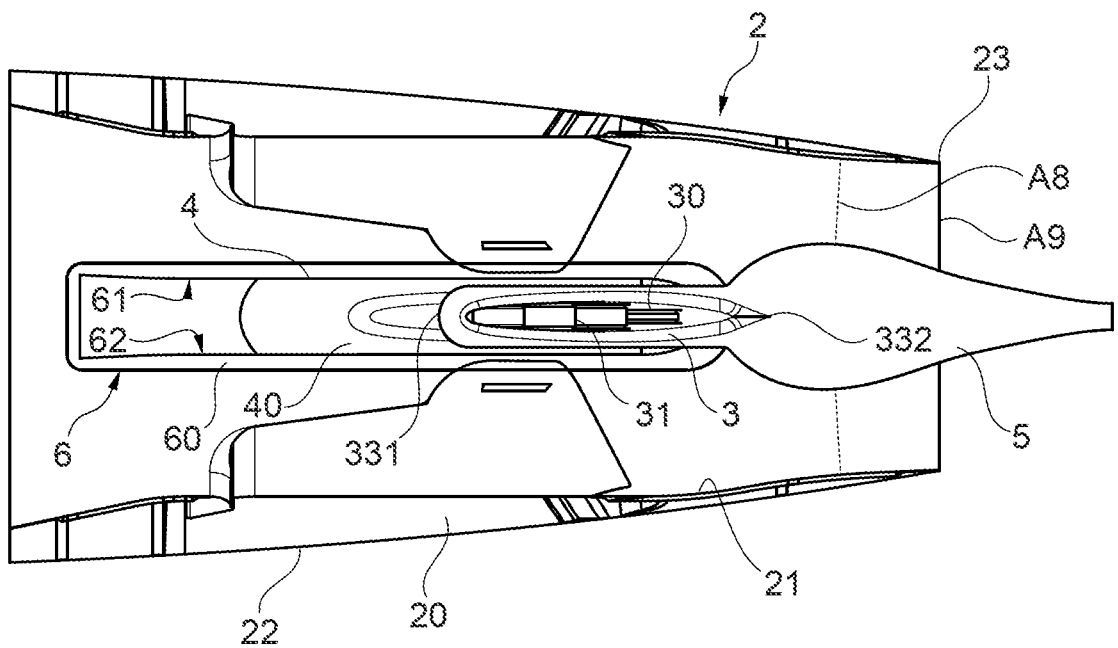
FIG. 9 is a side view of the nozzle of FIG. 7.
Figure 10:
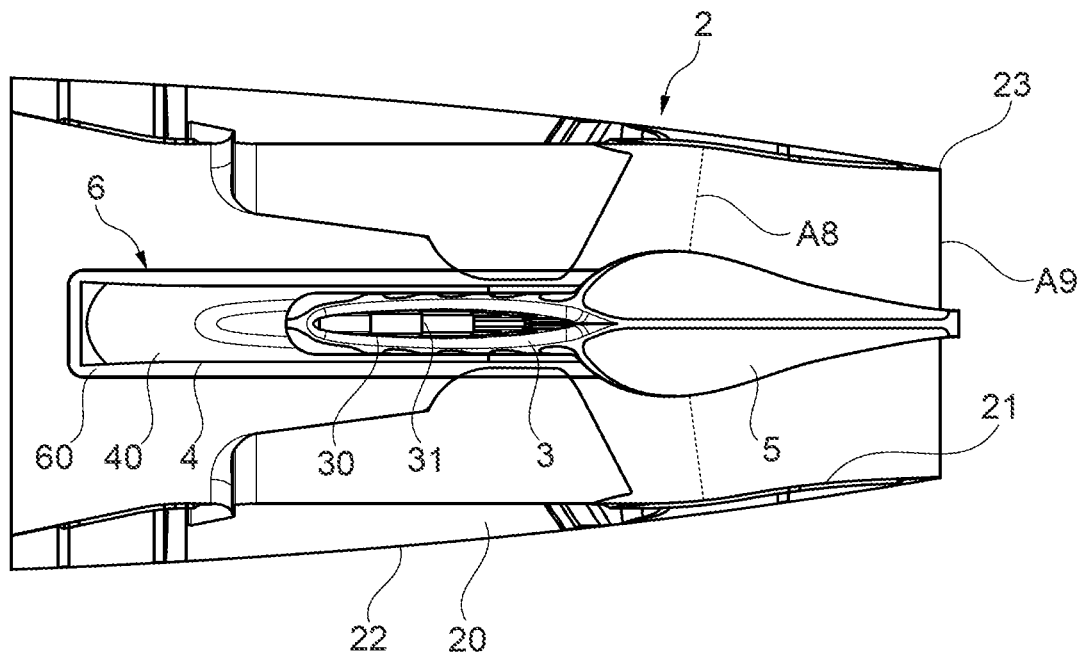
FIG. 10 is a side view of the nozzle of FIG. 8.

FIGS. 9 and 10 are side views from the inside of the nozzle towards the nozzle wall 20 which correspond to FIGS. 7 and 9 and, accordingly, show the first torsion box 40 in two different axial positions in the third torsion box 60. For a defined axial movement and stiff placement of the first torsion box 40 within the third torsion box 60, rail grooves 61, 62 formed at the upper and lower walls of the third torsion box 60 serve to guide corresponding upper and lower rails of the first torsion box 40.

FIGS. 9 and 10 further indicate that the strut 3 has a front edge 331 and a rear edge 332 as well as an upper side and a lower side. The strut 3 is formed in an aerodynamic manner to provide little pressure loss to the air stream. The sectional view of the strut 3 indicates the second torsion box 30 that is formed in strut 3 and a plurality of spars 31 extending in the radial direction within the second torsion box 30.

FIGS. 9 and 10 also indicate the location of a nozzle throat area A8 formed in the nozzle 2 where the cross-sectional area between centerbody 5 and inner wall 21 is minimum. Typically, the axial position of the nozzle throat area A8 is defined by the axial position of a maximum cross-sectional area of the centerbody 5. However, this is not necessarily the case. At the nozzle exit edge 23, the thrust nozzle forms a nozzle exit area A9. This area is equal to the difference between the cross-sectional area formed by the inner wall 21 at the nozzle exit edge 23 and the cross-sectional area of the centerbody 5 in the plane under consideration. The ratio A9 to A8 defines the degree of expansion of the flow channel 25 behind the nozzle throat area A8.

As can be seen, between the positions of the centerbody 5 in FIGS. 9 and 10 both A8 and A9 have changed due to the axial movement of the centerbody 5.

Figure 11:
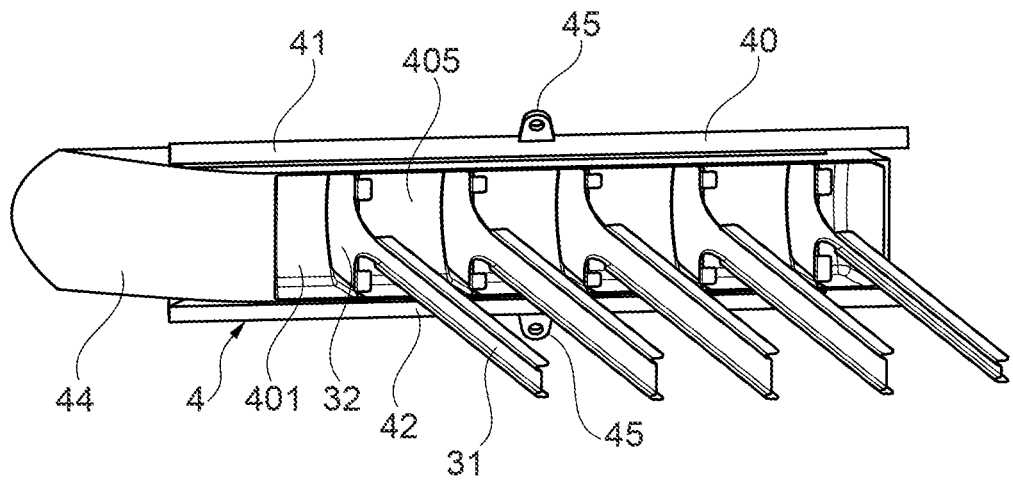
FIG. 11 is an exemplary embodiment of a boxlike connecting structure connecting the single strut to the outer nozzle wall.

FIG. 11 is a perspective view from inside the nozzle showing an embodiment of the first torsion box 40. The first torsion box 40 comprises an upper rail 41 and a lower rail 42 which serve to guide the torsion box 40 in the rail grooves 61, 62 of the third torsion box 60 shown in FIG. 9. The spars 31 which provide for additional structural stiffness of the strut 3 are connected at their T-like ends 32 to the first torsion box 40, wherein they extend in the circumferential direction in the volume 405 defined by the first torsion box 40. The first torsion box 40 further comprises a wedge shaped element 44 at one of its ends.

The radially inner wall of the first torsion box 40 discussed with respect to FIG. 5 is not shown in FIG. 11. Also not shown in FIG. 11 for simplicity are toothed racks or the like of the first torsion box 40 which interact with one or several actuators to axially move the first torsion box 40 in the third torsion box 60, as shown in FIGS. 5 and 6.

In this context, it is pointed out that a plurality of embodiments exist of how to linearly move the connecting structure 4, i.e. the first torsion box 40, in the receiving feature 6, i.e. the third torsion box 60. For example, the first torsion box 40 comprises two lugs 45. These lugs 45 may be connected to a linear actuator (not shown) for linear movement of the first torsion box 40.

Figure 12:
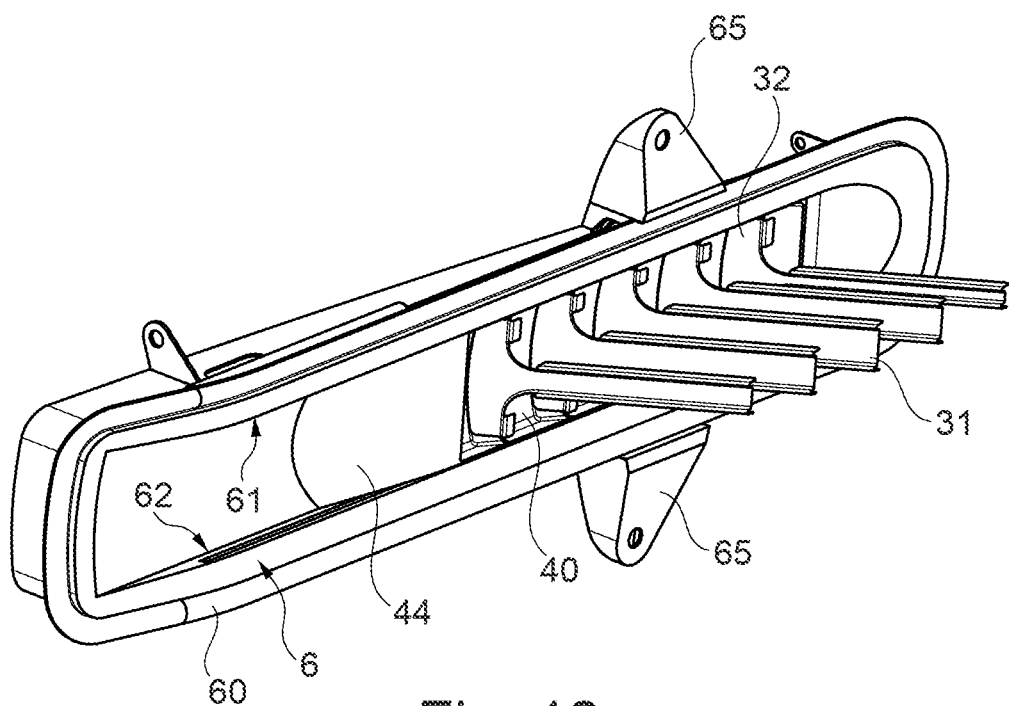
FIG. 12 is an exemplary embodiment of a boxlike receiving feature fixed to the outer nozzle wall, wherein the connecting structure of FIG. 11 is arranged in the boxlike receiving feature and can be displaced in the longitudinal direction within the boxlike receiving feature.

FIG. 12 shows an embodiment of the receiving feature 6 provided for by the third torsion box 40, wherein the first torsion box 40 of FIG. 11 is slidably arranged in the third torsion box 40. To this end, the upper and lower rails 41, 42 of the first torsion box 40 are guided in the upper and lower rail grooves 61, 62 of the third torsion box 60.

The third torsion box 60 is fixed by lugs 65 to the outer nozzle wall 20.

By providing both the connecting structure 4 as a torsion box 40 and the receiving feature 6 as a torsion box 60, and by further integrating a torsion box 30 into the strut 3, high resistance against torsional forces is provided for such that displacement or oscillation of the centerbody 5 in the nozzle 2 can be largely prevented even though the centerbody 5 is connected to the outer nozzle wall 20 by a single strut 3 only.

Figure 13:
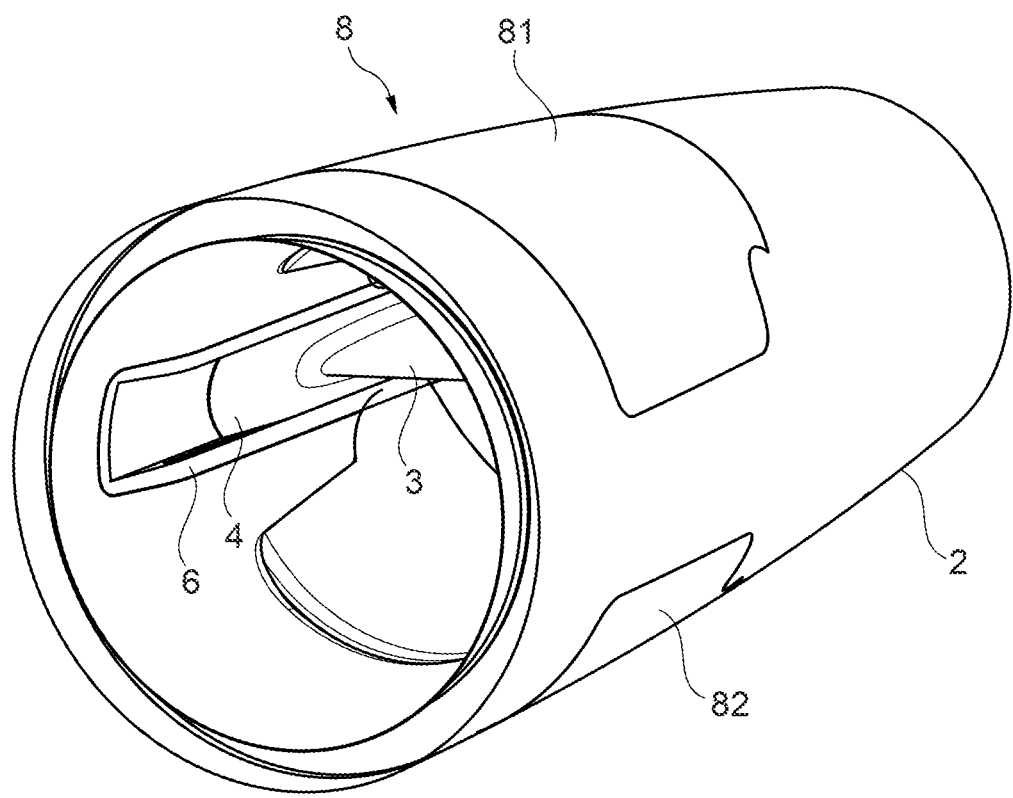
FIG. 13 is a front perspective view of the nozzle of FIGS. 2 and 6 to 12.

FIG. 13 is a perspective view of the nozzle from the outside. It is pointed out that a thrust reverser unit 8 having pivot doors 81, 82 may be integrated into the nozzle 2. In such case, the outer nozzle wall 20 is also the wall of the thrust reverser unit. In particular, the receiving feature 6 may be implemented in a side beam of the outer nozzle wall 20 which also serves as a structure for pivoting the pivot doors 81, 82 for thrust reversal. Also, the actuators for displacing the strut may be integrated into structural elements of the thrust reverser unit such as said side beam.

It should be understood that the above description is intended for illustrative purposes only and is not intended to limit the scope of the present disclosure in any way. Also, those skilled in the art will appreciate that other aspects of the disclosure can be obtained from a study of the drawings, the disclosure and the appended claims. All methods described herein can be performed in any suitable order unless otherwise indicated herein or otherwise clearly contradicted by context. Various features of the various embodiments disclosed herein can be combined in different combinations to create new embodiments within the scope of the present disclosure. In particular, the disclosure extends to and includes all combinations and sub-combinations of one or more features described herein. Any ranges given herein include any and all specific values within the range and any and all sub-ranges within the given range.

The invention claimed is:

1. An exhaust nozzle of a gas turbine engine, wherein the exhaust nozzle comprises:
   an outer nozzle wall,
   a flow channel which is limited radially outwards by the outer nozzle wall,
   a centerbody arranged in the flow channel,
   exactly one strut connecting the centerbody to the outer nozzle wall,
   wherein the strut is connected to the outer nozzle wall by a connecting structure that is displaceable in an axial direction of the outer nozzle wall, and
   at least one actuator interacting with the connecting structure or the outer nozzle wall for displacing the strut in the axial direction.

2. The nozzle of claim 1, wherein the connecting structure comprises a first hollow torsion box.

3. The nozzle of claim 2, wherein the connecting structure has a cuboid form.

4. The nozzle of claim 2, further comprising a receiving feature in the outer nozzle wall that extends in the axial direction for receiving and guiding the first hollow torsion box.

5. The nozzle of claim 4, wherein the first hollow torsion box is slidably arranged in the receiving feature.

6. The nozzle of claim 5, wherein the receiving feature comprises upper and lower guide elements for guiding the first hollow torsion box in the receiving feature.

7. The nozzle of claim 6, wherein the first hollow torsion box structure comprises upper and lower rails and wherein the upper and lower guide elements are formed as rail grooves.

8. The nozzle of claim 5, wherein the receiving feature is formed by a second hollow torsion box which is fixed in the outer nozzle wall.

9. The nozzle of claim 1, wherein the strut comprises a hollow torsion box that extends radially between the centerbody and the connecting structure.

10. The nozzle of claim 1, wherein the strut comprises a plurality of spars which extend in a radial direction and which are connected to the connecting structure.

11. The nozzle of claim 10, wherein the spars each comprise a flat T-shaped end that is connected to the connecting structure.

12. The nozzle of claim 11, wherein the T-shaped ends that are connected to the connecting structure are oriented in a circumferential direction of the nozzle.

13. The nozzle of claim 1, wherein the connecting structure comprises at least one interaction element which interacts with the at least one actuator for axial movement of the strut, wherein the at least one actuator is located in a fixed manner outside the connecting structure.

14. The nozzle of claim 13, wherein the at least one actuator includes an upper actuator and a lower actuator located in the outer nozzle wall and the at least one interaction element includes an upper toothed rack and a lower toothed rack which are spaced apart in a circumferential direction, wherein the upper toothed rack and the lower toothed rack interact with the upper actuator and the lower actuator, respectively.

15. The nozzle of claim 14, wherein the upper actuator and the lower actuator each comprises a worm screw that interacts with the upper toothed rack and the lower toothed rack, respectively.

16. The nozzle of claim 13, wherein the at least one actuator includes a linear actuator and the at least one interaction element includes one or several lugs connected to the a linear actuator.

17. The nozzle of claim 1, wherein the connection structure is positioned in an inboard area of the nozzle located adjacent an aircraft fuselage.

18. The nozzle of claim 1, wherein the strut is connected to a structure of the outer nozzle wall that forms part of a thrust reverser unit.

19. The nozzle of claim 1, wherein the nozzle is configured as a nozzle of a supersonic gas turbine engine.

20. An exhaust nozzle of a gas turbine engine, wherein the exhaust nozzle comprises:
- an outer nozzle wall,
- a flow channel which is limited radially outwards by the outer nozzle wall,
- a centerbody arranged in the flow channel,
- exactly one strut connecting the centerbody to the outer nozzle wall,
- wherein the strut is connected to the nozzle wall by a connecting structure that is displaceable in an axial direction in a receiving feature in the outer nozzle wall,
- at least one actuator interacting with the connecting structure or the outer nozzle wall for displacing the strut in the axial direction,
- wherein the connecting structure comprises a first hollow torsion box and wherein the receiving feature comprises a second hollow torsion box fixed in the outer nozzle wall, wherein the first hollow torsion box is displaceable in the axial direction in the second hollow torsion box,
- wherein the first hollow torsion box comprises upper and lower rails,
- wherein the second hollow torsion box comprises upper and lower rail grooves, and
- wherein the upper and lower rail grooves of the second hollow torsion box receive the upper and lower rails of the first hollow torsion box, respectively.

* * * * *